United States Patent [19]

Rothmund

[11] Patent Number: 5,013,179

[45] Date of Patent: May 7, 1991

[54] BOX-SHAPED BASE CONSISTING OF TWO WEDGE-COUPLED SHELLS

[76] Inventor: René Rothmund, Holunderweg 8, 7000-Chur, Switzerland

[21] Appl. No.: 413,295

[22] Filed: Sep. 27, 1989

[30] Foreign Application Priority Data

Mar. 6, 1989 [IT] Italy .............................. 19408/89[U]

[51] Int. Cl.$^5$ .............................................. F16B 17/00
[52] U.S. Cl. ..................................... 403/335; 403/375
[58] Field of Search ................ 403/335, 338, 364, 375

[56] References Cited

U.S. PATENT DOCUMENTS

| | | | |
|---|---|---|---|
| 4,664,551 | 5/1987 | Poitier | 403/335 |
| 4,682,672 | 7/1987 | Berger et al. | 403/338 X |
| 4,755,109 | 7/1988 | Botts | 403/375 X |

FOREIGN PATENT DOCUMENTS 2505268 11/1982 France ................................ 403/364

Primary Examiner—Peter M. Cuomo
Attorney, Agent, or Firm—Leonard Bloom

[57] ABSTRACT

This invention concerns a box-shaped base formed by wedge coupling two identical moulded plastic half-shells, for use in the construction of chairs, armchairs, tables or other types of furniture.

1 Claim, 3 Drawing Sheets

BOX-SHAPED BASE CONSISTING OF TWO WEDGE-COUPLED SHELLS

BACKGROUND OF THE INVENTION

This patent application for an industrial utility model concerns a box-shaped base formed by wedge coupling two identical half-shells made of moulded plastic materials used in the construction of chairs, armchairs, tables or other types of furniture.

The manufactured article in question was designed to improve the construction technique and the practical characteristics of furniture units such as garden furniture or other types of outdoor furniture consisting of several components such as seats, chair backs, bases—made of plastic materials.

It is a well known fact that to date plastic materials are commonly used for the construction of outdoor furniture, that is furniture to be exposed to bad weather conditions or atmospheric agents, not so much for the construction of the supporting structures or ground supports such as legs, feet or armrests but above all for the construction of the functional parts of the various types of furniture, such as seats, chair backs or even table tops.

It should be noted however that to date the production techniques used for these components often resort to totally standardized shapes and solutions, of which any expert in the sector, and often even the user himself knows the advantages and disadvantages; these furnishing components in plastic material have often been produced on the fundamental criteria of making them resistant and lasting, over and above any other characteristic.

On this basis, the products have often been roughly made and not extremely attractive, and above all very repetitive; one of the most popular solution has for example been that of producing certain furniture components in plastic materials such as chair backs, seats or table tops in the form of a latticework, resulting from the regular intersection of rows and lines of through holes made on the surface of the different manufactured articles; at times thick stiffening ribs were made on the internal and not visible surface of the manufactured article, generally resulting, at the corresponding areas, in unattractive hollows or cavities on the visible surface.

SUMMARY OF THE INVENTION

In order to resolve these problems typical of these construction techniques, the manufactured article according to the invention was designed which, in view of its structural characteristics, is not only extremely attractive in terms of appearance but is also sturdy and practical.

The base in question is in fact obtained from the wedge-coupling of two box-shaped half-shells made of moulded unfilled thermoplastic resins—that is, containing no stiffening inert fillers (aggregates),—to which the most suitable shape and surface extension can be given as necessary in that generally one of the two half-shells has a supporting function with respect to the other and consequently with respect to the entire structure.

In particular usually one of the two half-shells is totally hollow inside and therefore has a perfectly regular external surface suitable for decorative finishes; in view of its attractive appearance, this half-shell is generally fitted on the furniture unit being constructed as the part which is most visible to the user, such as the top horizontal surface of a table or the front and/or back surface of a chair back or even the top surface of a chair seat.

The other of the two box-shaped half-shells is on the other hand usually moulded so as to have a series of stiffening ribs on its internal surface, which not only make the other half-shell sturdy but the entire base according to the invention as well; in addition to this, as a result of the wedge-coupling of the two half-shells, these ribs on the internal surface of one of the two half-shells fit under the internal surface of the other half-shall making the overall manufactured article even more rigid.

According to the latter it is evident how the invention can claim to be a composite and very sturdy structure whose solidity equals and exceeds that of currently produced tops, seats and chair backs made of plastic material with through holes and stiffening ribs; it is just as evident that the base according to the invention can be considered far superior to any previous production in terms of appearance and practicality.

It is immediately evident that the particular structure of the base according to the invention can in itself make the same very sturdy and resistant, and consequently unfilled thermoplastic resins may be used in the moulding process, contrary to what has been done to date in the production of furnishing accessories which always required the use of resins rich in stiffening fillers to ensure reliable solidity.

The use of these unfilled resins, which are considerably cheaper with respect to filled resins, makes it possible to reduce the cost of raw material in the production of various types of furnishing articles compared to the same weight; naturally resins having higher filler contents—of the type used to date in the specific sector—on one hand are much more expensive and on the other hand result in a finished product after moulding which weighs much more.

Purely for illustrative purposes it could in fact be said that moulding the box-shaped base according to the invention could be carried out using pure polyproylene, which, as is commonly known, has many chemical-physical advantages related to the easy transformation and a high resistance to the deteriorating action of atmospheric agents, in any climatic conditions and even for prolonged periods of time; this material is also well known in that it can be successfully treated with colouring of any type and for the highly polished surface it gives to the finished product.

In addition to this it can be considered as particularly suitable for the development of the manufactured article according to the invention also in view of the fact that the product obtained has an excellent quality-price ratio; in fact, if on one hand the base according to the invention has very evident advantages in terms of practicality and appearance, on the other hand its costs are not too high, since the characteristics of intrinsic solidity of the box-shaped structure in question make it possible to construct the above two box-shaped half-shells with very reduced thickness and therefore, on the whole, with the use of limited quantities of plastic resin.

As mentioned, it can be claimed that the box-shaped base according to the invention may be considered as undoubtedly more attractive than any other previous equivalent production and not only because the structure has a certain thickness and consequently capable of being modelled in many different shapes but also because the same is formed by the combination of two separate half-shells which can in fact be produced in different colours so as to obtain attractive colour combinations on the finished product.

The box-shaped form of the manufactured article according to the invention makes it possible to limit the number of internal stiffening ribs as much as possible making it possible to carry out a vast number of different decorations and ornamental patterns without these being affected negatively by the presence of unattractive surface hollows or cavities.

Possibly similar construction faults may be present on the surface of the half-shell fitted internally with the necessary stiffening ribs, but as mentioned, generally this surface is a part of the finished furniture unit which is not extremely visible and consequently will not compromise the overall attractive appearance of the base in question. It should however be noted that using the same invention concept, it is possible to produce many different embodiments of the manufactured article according to the invention; for example, if necessary, particular models could be produced characterized by stiffening ribs on one or the other of the half-shells, or a version with stiffening ribs on the internal surface of both half-shells.

In particular the latter embodiment could be carried out by fitting stiffening ribs on the internal surface of one of the two half-shells, placed longitudinally and intersecting and wedging together perfectly—by means of a traditional system of matching notches, similar to that frequently used by carpenters—with a series of stiffening ribs placed transversely on the internal surface of the other half-shell; this construction technique would make it possible to create a latticework of ribs firmly joined together inside the manufactured article in question, which obviously would make the same extraordinarily solid.

BRIEF DESCRIPTION OF THE DRAWINGS

For major clarity the description of the invention continues with reference to the enclosed drawings which are intended for illustrative purposes.

DETAILED DESCRIPTION OF THE PREFERRED EMBODIMENT(S)

Figure 1:
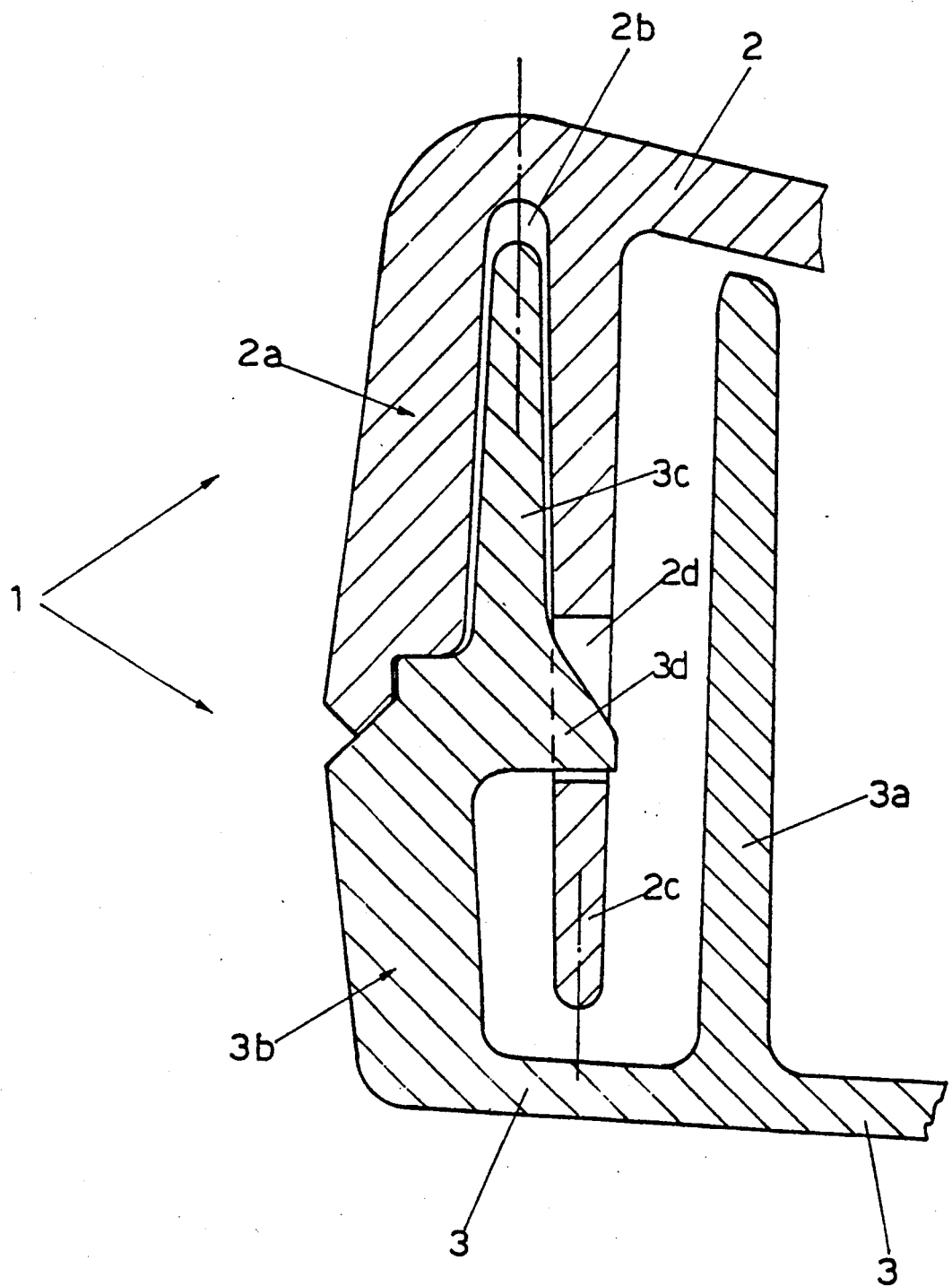
FIG. 1 is a cross section with a transverse plane of an edge of the box-shaped base according to the invention which illustrates the mutual wedging system of its two half-shells.
Figure 2:
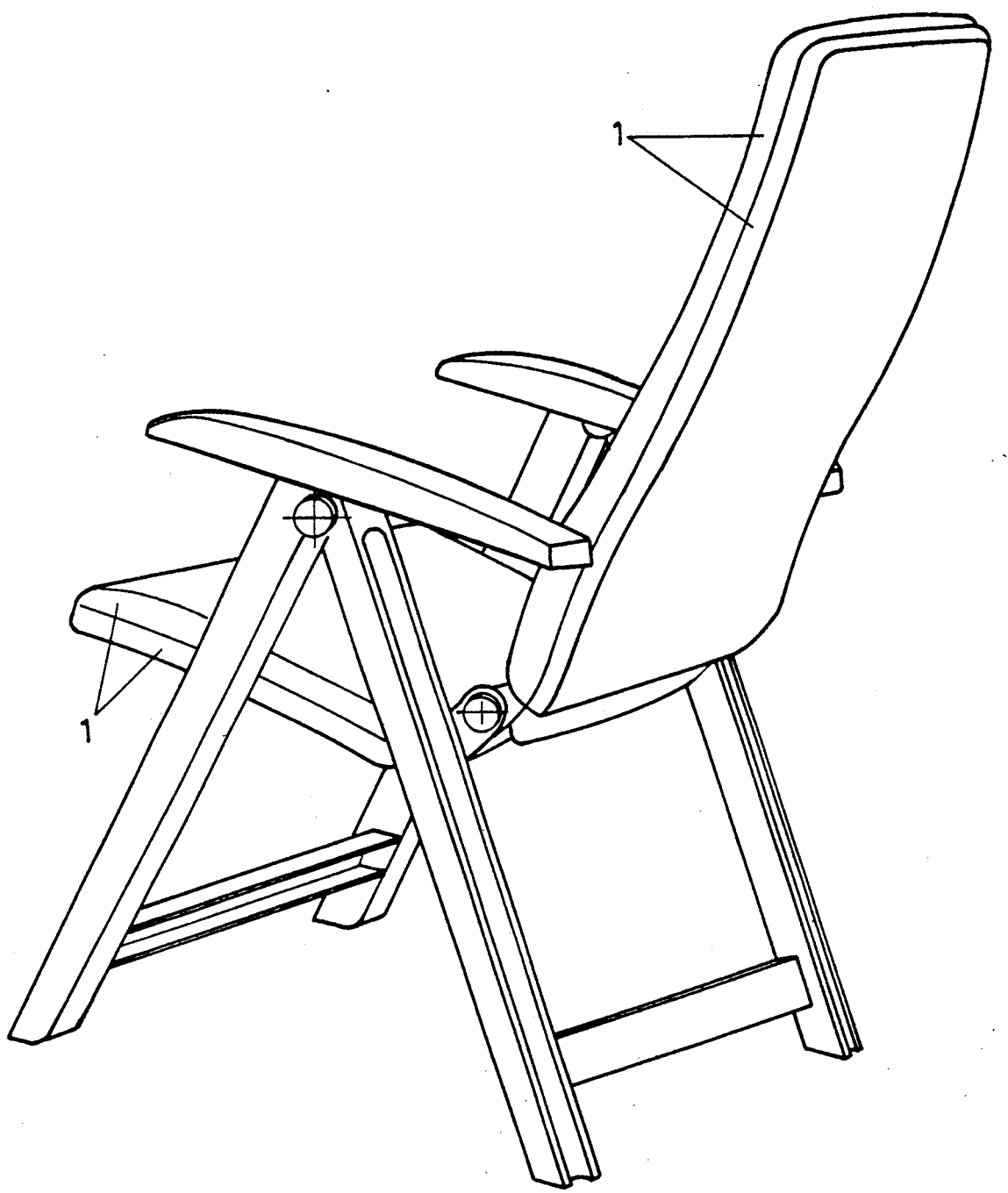
FIGS. 2 and 3 illustrates two possible ways of using the manufactured article according to the invention; in the first the base is used as seat and chair back in the production of a folding chair while in the latter it is used as a table top.
Figure 3:
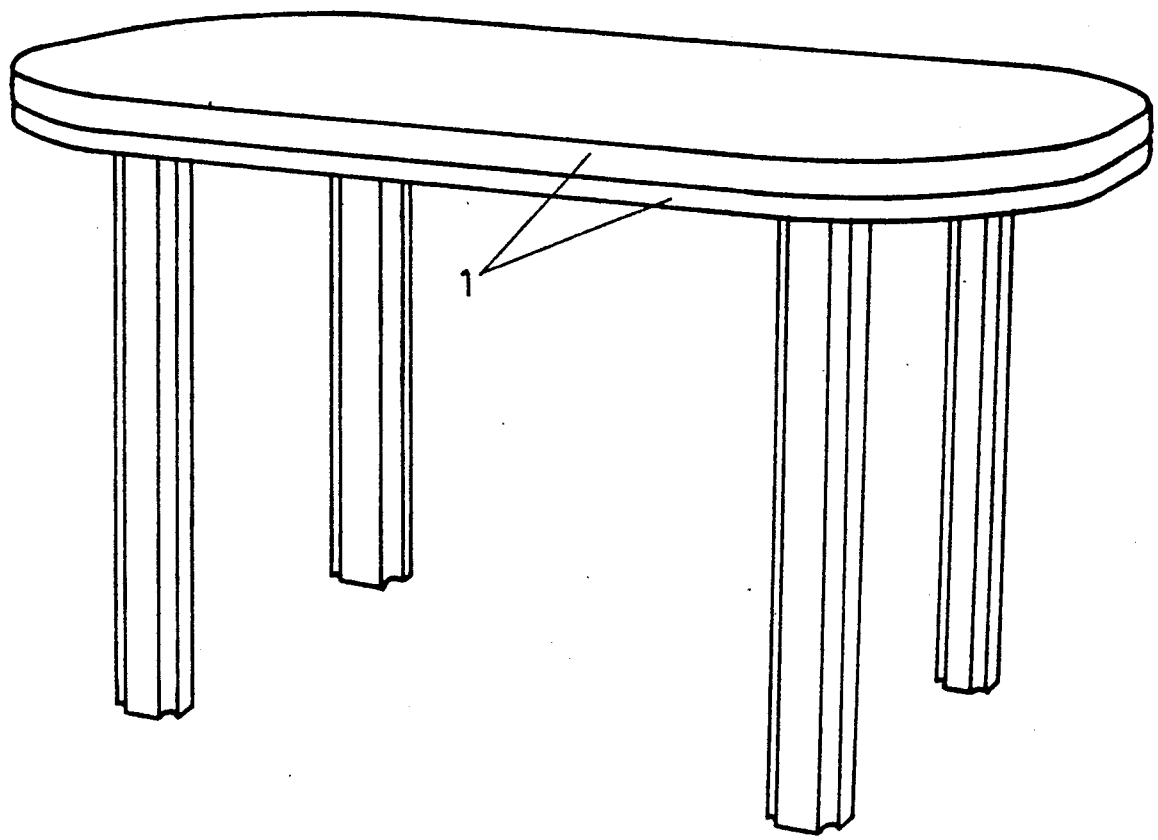

With particular reference to FIG. 1—which represents only one of the possible embodiments of the invention—the base in question (1) is formed by the wedge coupling of two box-shaped half-shells having an identical surface extension; one of the two shells (2) having a smooth internal surface while the other shell (3) having ribs (3a) on its internal surface which exert the necessary stiffening action for the overall structure (1); these stiffening ribs (3a) have, for this purpose, a height being approximately equal to that of the vertical peripheral edges (3b).

In order to allow the wedge coupling of the two box-shaped half-shells (2) and (3), their respective vertical peripheral sides are particularly shaped: the half-shell (3) which is peripherally fitted with stiffening ribs (3a) has short vertical side peripheral walls (3b), from the top of which a wedge shaped lip (3c) projects—running along the full perimeter of the half-shell (3)—at the base of which coupling teeth (3d) which are turned inwards, are fitted at regular intervals.

The other half-shell (2) has high vertical side walls (2a) at the back of which a deep groove (2b) is fitted, delimited inwards by another peripheral vertical edge (2c) having several slots (2d) at regular intervals along its longitudinal length.

By closing the two above half-shells (2) and (3) against each other, the wedge shaped lip (3c) of half-shell (3) is fixed into the peripheral groove (2b) of half-shell (2); this coupling being stable and practically unmovable in that the above coupling teeth (3d) fit inside the corresponding matching slots (2d).

When assembly has been completed, it can be noted that the stiffening ribs (3a) on the internal surface of the half-shell (3) fit against the internal surface of the completely hollow half-shell (2), ensuring in this way, as mentioned, that the entire manufactured article (1) is satisfactorily solid as well as having an excellent resistance even to considerable weights.

What is claimed is:

1. A sturdy base for use in the construction of furniture comprising: a first half-shell and a second half-shell, the first half-shell having a regular external surface suitable for decorative finishes, the first half-shell being substantially hollow, the second half-shell having at least one rib therein, and means for coupling the half-shells to one another to substantially prevent subsequent separation thereof; wherein the first half-shell has vertical side walls having a height, the first half-shell further having a peripheral vertical edge, the vertical edge having a longitudinal length, such that a groove is formed between the side walls and the vertical edge, the vertical edge having a plurality of spaced apart slots at regular intervals along the longitudinal length of the vertical edge; the second half-shell having at least one stiffening rib formed therein, the second half-shell further having vertical side peripheral walls, said side walls being spaced apart from the at least one stiffening rib, said side walls having a top and having a height which is less than the height of the vertical side walls of the first half-shell, a wedge shaped lip being formed on the top of said side walls of the second half-shell, the lip having a bottom, a plurality of spaced apart teeth being formed at regular intervals on the bottom of the lip, the teeth being oriented in a direction toward the at least one stiffening rib and in a direction opposite to the side walls, such that when the two half-shells are placed against one another, the teeth on the second half-shell may couple with the slots on the first half-shell, the lip of the second half-shell being received in the groove in the first half-shell and the side walls of the first half shell contacting the vertical side walls of the second half-shell such that access to the teeth and the slots is prevented.

* * * * *